UNITED STATES PATENT OFFICE.

SAMUEL T. SMITH, OF BLUE ISLAND, ILLINOIS.

RUBBER-PRESERVATIVE COMPOSITION.

1,156,561.  Specification of Letters Patent.  Patented Oct. 12, 1915.

No Drawing.  Application filed January 16, 1914.  Serial No. 812,429.

*To all whom it may concern:*

Be it known that I, SAMUEL T. SMITH, a citizen of the United States, residing at Blue Island, in the county of Cook and State of Illinois, have invented certain new and useful Improvements in Rubber-Preservative Compositions, of which the following is a specification.

My invention relates to a rubber preservative compound and has for its general object to provide a composition of matter which, when suitably applied to rubber, will prevent deterioration of the rubber due to age and exposure to atmospheric conditions; and which is cheap, easily compounded, readily applied, and lasting in its effect.

It is a well known fact that rubber, whether of the superior quality that is customarily used in rubber bands, tubes for pneumatic tires, and the like, or of the relatively inferior quality found in overshoes and other articles of apparel, and in many other manufactures, is liable to rapid deterioration or aging under ordinary atmospheric conditions, even when not in use; such deterioration resulting in the rubber losing its elasticity and pliability, and tending to take a "set" in whatever configuration it may stand during the period of non-use, so that the rubber is apt to check or break in after-use. Also it is well known that the deterioration or "rotting" of rubber is, in general, greatly hastened if it is subject to the action of mineral or animal oils or greases, so that an article which has come in contact with oils or greases, such as a rubber boot that has been worn around a railroad yard, or a rubber raincoat that has come in contact with the neck of the wearer, is particularly susceptible to deterioration wherever the oil or grease has adhered.

I have found by proper tests and experience that a composition of matter as hereinafter set forth and claimed is very effective both in cleansing rubber of any grease or oil of a mineral or animal character that it may have accumulated, and in preserving substantially unchanged its resiliency and flexibility for long periods of time, without itself in any way detrimentally affecting the rubber.

As the principal ingredients of my composition I employ oily, substantially non-volatile, vegetable substances combined with a highly volatile detergent having the quality of attacking animal and mineral greases. Specifically I employ, in the preferred embodiment of my invention, a purely vegetable grease such as cocoa-butter, having considerable body and susceptible of permanent dilution by vegetable oil; mixed with or diluted by a substantially non-volatile vegetable oil such as castor oil; and further mixed with and diluted by a liquid detergent such as gasolene or ether, or the like, the first named detergent being preferred on account of its cheapness. In preparing the preservative compound I take these ingredients in the proportion of two ounces of cocoa-butter to two quarts of castor oil and one quart of gasolene; melt the cocoa-butter, stir in the castor oil until thoroughly mixed, and then into the liquid I stir the gasolene, until the three are thoroughly mixed. The compound I seal until used, to prevent evaporation of the gasolene. I find that the composition remains, while sealed, a permanent emulsion, that is, one which will stand indefinitely without separation of its ingredients, whether warm or cold; although under exposure to low temperature the compound turns white, returning to its normal color when again warmed.

In using the compound on clean rubber it is necessary only to superficially coat the rubber as by immersing it in the compound or painting or rubbing the compound thereon. Where the rubber is greasy, the grease spots should be rubbed, preferably, with the compound, and it will be found that the grease is readily removed. I find that while applying the compound and almost immediately rubbing it off has a very beneficial effect on the rubber, it is better to leave the compound on for a period of from 24 to 48 hours where this conveniently can be done and where the rubber article is not to be used for a long period of time it is well to leave it coated with the composition until it is again needed for use. To remove the compound I merely rub it off with a soft cloth. Little or no change in the applied composition itself (beyond evaporation of the gasolene) will be noted even after a long period of time has elapsed, and when the preservative is removed, the rubber will be found in a perfect condition of preservation. Even a very temporary application has a notable effect to prevent subsequent deterioration after the preservative has been removed.

It is my theory that the gasolene, ether, or other volatile detergent has the effects both of cleansing the surface of the rubber and giving to the preservative compound a quality of penetration insuring that it fills all of the irregularities or pores of the rubber surface, its rapid evaporation, however, insuring that it does no injury to the rubber in the presence of the vegetable oils.

While I have herein described in detail a particular composition embodying my invention for purposes of full disclosure of a particular formula which I have found to be most satisfactory in actual experiments, it will be understood that I do not intend to limit my invention in its broader aspect to the exact ingredients and proportions employed otherwise than as specified in the claims.

What I claim is:—

1. A rubber preservative compound comprising in combination cocoa-butter, castor-oil and gasolene.

2. In a rubber preservative compound, the combination of cocoa-butter, castor-oil and gasolene in substantially the proportions of two ounces to two quarts to one quart respectively of said ingredients.

3. In a rubber preservative compound, the combination of cocoa-butter, castor oil and a volatile detergent in proportions substantially as described.

4. In a rubber preservative compound the combination of a material of cocoa butter like characteristics, a material of castor oil like characteristics and a volatile detergent in proportion substantially as described.

In testimony whereof I hereunto set my hand in the presence of two witnesses.

SAMUEL T. SMITH.

In the presence of—
ALBERT G. WYANT,
GEO. F. MAY, Jr.